(12) United States Patent
Durand et al.

(10) Patent No.: US 7,961,776 B2
(45) Date of Patent: Jun. 14, 2011

(54) DIGITAL RECEIVER DEVICE FOR DSSS-ENCODED SIGNALS

(75) Inventors: Benoît Durand, Rousset (FR); Christophe Fraschini, La Garde (FR); Philippe Courmontagne, Belgentier (FR); Stéphane Meilleire, Neoules (FR)

(73) Assignees: STMicroelectronics (Rousset) SAS, Rousset (FR); Universite de Provence d'Aix-Marseille I, Marseilles (FR)

( * ) Notice: Subject to any disclaimer, the term of this patent is extended or adjusted under 35 U.S.C. 154(b) by 1152 days.

(21) Appl. No.: 11/605,828

(22) Filed: Nov. 28, 2006

(65) Prior Publication Data
US 2007/0133664 A1 Jun. 14, 2007

(30) Foreign Application Priority Data
Nov. 29, 2005 (FR) ...................... 05 12094

(51) Int. Cl.
*H04B 1/00* (2006.01)
(52) U.S. Cl. ........ 375/152; 375/140; 375/142; 375/143; 375/145; 375/149; 375/150; 375/343; 708/314
(58) Field of Classification Search .................. 375/140, 375/142, 143, 145, 149, 152, 150, 343; 708/314
See application file for complete search history.

(56) References Cited

U.S. PATENT DOCUMENTS

| | | | | |
|---|---|---|---|---|
| 5,239,496 A | * | 8/1993 | Vancraeynest | ................ 708/422 |
| 5,263,033 A | | 11/1993 | Seshadri | |
| 5,732,089 A | * | 3/1998 | Negi | .............................. 714/704 |
| 6,091,785 A | | 7/2000 | Lennen | |
| 2002/0131532 A1 | | 9/2002 | Chi et al. | |
| 2002/0141489 A1 | * | 10/2002 | Imaizumi | ....................... 375/150 |
| 2003/0116617 A1 | * | 6/2003 | Perkins et al. | ..................... 234/3 |
| 2003/0123408 A1 | * | 7/2003 | Saitou | ............................ 370/335 |
| 2004/0146091 A1 | * | 7/2004 | Chang et al. | .................. 375/147 |

OTHER PUBLICATIONS

Preliminary French Search Report and Written Opinion, FR 05 12094, dated Sep. 1, 2006.

* cited by examiner

*Primary Examiner* — Shuwang Liu
*Assistant Examiner* — Sung Ahn
(74) *Attorney, Agent, or Firm* — Gardere Wynne & Sewell LLP; Andre M. Szuwalski

(57) ABSTRACT

A device for decoding a direct sequence spread spectrum-encoded binary message includes a sampler that captures at least one sequence of binary samples corresponding to one bit of the transmitted message. The captured sequence of samples are applied to a filter matched to the spreading code used, thus making it possible to delete the spreading applied to the original message. The device further includes, at the output of the sampler, an error correction block including a memory storing a plurality of binary sequences corresponding to all of the possible values for a captured sequence of samples. A replacement circuit replaces the captured sequence of samples with the stored sequence, thereby minimizing the number of samples different from the captured sequence of samples, and allowing the stored sequence to be applied to the matched filter.

16 Claims, 4 Drawing Sheets

_US 7,961,776 B2_

DIGITAL RECEIVER DEVICE FOR DSSS-ENCODED SIGNALS

PRIORITY CLAIM

This application claims priority from French Application for Patent No. 05 12094 filed Nov. 29, 2005, the disclosure of which is hereby incorporated by reference.

BACKGROUND OF THE INVENTION

1. Technical Field of the Invention

The present invention relates in general to the processing of digital signals and, in particular, to the techniques for decoding such signals in applications involving digital radio frequency communication.

More particularly, the invention relates to a device for decoding a direct sequence spread spectrum (DSSS) encoded binary message, as well as a digital receiver device incorporating such a device.

2. Description of Related Art

In the context of a digital communication where the message is direct spread spectrum-encoded, the "0" and "1" bits are encoded with respective symbols sent by the transmitter, and decoded at the receiver by a DSSS decoder.

In the case where the bits are encoded using a Barker code of length N, the symbols encoding the "0" and "1" bits are each in the form of a series of N symbol elements ("0" or "1"), called "chips", distributed over either of two different levels and transmitted at a predetermined fixed frequency F.

The symbol elements encoding the "1" bit are anti-correlated to the corresponding symbol elements encoding the "0" bit, i.e., the symbol elements of the same rank within both of these two symbols have opposite values.

For example, if and when a symbol element of the symbol encoding the "1" bit is at level 1, the corresponding symbol element of the symbol encoding the "0" bit is at level −1. In the same way, if and when a symbol element of the symbol encoding the "1" bit is at level −1, the corresponding symbol element of the symbol encoding the "0" bit is at level 1.

The spread binary message is then used to phase-modulate the carrier, appearing in the form of a time-dependent sine wave recorded as p(t), p(t)=cos(2πfp.t+φ), where fp is its frequency and φ its original phase.

Thus, where m is a binary message of length r, m can be noted in the following way: $m=(I_0, I_1, \ldots, I_{r-1})$ with $I_k=0$ or 1.

For example, with r=5, m=(1,0,0,1,0). Often, in order to transmit this type of message, the waveform prior to modulation will be $$w(t) = \sum_{k=o}^{r-1} I_k g(t - kT_b)$$

where $T_b$ is the bit-time. The function g(t) is generally defined as follows $g(t)=1$ if $0 \leq t \leq T_b$; otherwise 0.

It is then said that the message m is NRZ-encoded ("non return to zero"). An illustration of the preceding example of m being NRZ-encoded is provided in FIG. 1.

It is seen that the NRZ code cannot be transmitted directly because, in the case of a long series of zeros or ones, the binary rhythm can no longer be recovered by the receiver. The direct spread spectrum encoding then replaces the NRZ-encoded signal with a differently encoded signal whose spectrum is more suitable.

Direct spectrum spreading comprises transmitting the pseudo-random sequence C(t) when $I_k=1$ and $\overline{C}(t)$ when $I_k=$). These pseudo-random sequences have the pattern $$C(t) = \sum_{k=0}^{N-1} c_k \prod T_c(t - kT_c)$$

where $T_b = rT_c$, $T_c$ is the duration of a symbol element or of the spreading code, and $\Pi T_c = 1$ if $0 \leq t \leq T_c$, otherwise 0.

The integer N is the (spectrum) spreading factor. The sequence $c=\{c_0, c_1, \ldots, c_{N-1}\}$ is selected such that the autocorrelation function of c(t) is close to 0 for lags other than 0. For example, the Barker code 5 is defined by the sequence c={1,1,1,0,1}. C(t), representing the binary message m={1,0,0,1,0} spread (DSSS-encoded) by the Barker code 5, is shown in FIG. 2.

The DSSS encoding is thus characterized by the sequence $c=\{c_0, c_1, \ldots, c_{N-1}\}$. Conventionally, DSSS encoding makes it possible to find the NRZ-encoded message as well as the associated synchronization, and then, using these two signals, to find the original message m.

A conventional DSSS decoder architecture is provided in FIG. 3. The analog portion of the receiver chain situated upstream from the decoder DEC, typically including amplification and demodulation means, is not shown because it does not hold any specific importance within the scope of this invention. The input signal IN of the decoder, supplied at the output of an analog-to-digital converter not shown, is subjected to a sampler 10 of the decoder DEC. Given the integer K, called the sampling factor, corresponding to the number of samples captured by the sampler 10 during the time period $T_c$, then Shannon's sampling theorem implies the relationship $K \geq 2$.

At the output of the sampler 10, the decoder DEC comprises a filter stage matched to the spreading code used, making it possible to recover the synchronization of the signal to be decoded in relation to the useful information. More precisely, this involves a finite impulse response digital filter FIR, characterized by the coefficients of its impulse response, which must correspond to the exact replica of the spreading code selected.

More precisely, the structure of this filter is that of a shift register REG including a plurality of bistable circuits receiving each sample of the input signal IN. One bit of the message transmitted thus corresponds to KN samples, in the case of a spreading code with N symbol elements. Therefore, at each moment, the KN last samples received from the sampler are stored in the variables $z_0$ to $z_{KN-1}$ of the shift register.

The shift register cooperates with a combinational circuit COMB, designed in a manner known to those skilled in the art, and involving the series of coefficients $c_i$ such that the output signal OUT of the filter has an amplitude directly dependent upon the level of correlation observed between the sequence of the KN last samples captured by this filter and a series of KN symbol elements of one of the two symbols, e.g., the series of the N elements of the symbol encoding a "1" bit of the digital signal.

Thus, the matched filtering operation comprises matching the series of coefficients $c_i$ to the exact replica of the spreading code used, in order to correlate the levels of the symbol elements received in succession at the input of the filter to the levels of the successive symbol elements of one of the two symbols encoding the "0" and "1" bits, e.g., the symbol elements of the symbol encoding the "1" bit.

Thus, according the principle set forth above, at each moment, the variables $z_i$ of the register, representing a binary sequence of the KN last samples received, are weighted by the set of coefficients $c_o$ to $c_{N-1}$, each coefficient representing an element of the spreading code used repeated K times during the weighting operation, prior to being summed up in order to supply the output signal OUT. This signal is provided for application to a first and a second hysterisis comparator, Comp1 and Comp2, respectively.

The signals associated with the decoder of FIG. 3, for a message encoded as Barker 5, are shown in FIG. 4.

The signal OUT at the input of the comparators typically supplies synchronization peaks, the sign of which provides the value of the bit of the original message at that moment; if the peak is negative, it is a "0", and if the peak is positive, it is a "1". The hysterisis comparators, Comp1 and Comp2, respectively, thus make it possible to transform the symbols thus decoded into a binary data flow corresponding to the original message, as well as to associate them with a synchronization clock. The original NRZ-encoded message, as well as the synchronization clock, are thus restored at the output of the hysterisis comparators Comp1 and Comp2, respectively.

More precisely, the first comparator Comp1 toggles as soon as the signal passes below a lower threshold value or above an upper threshold value, and then supplies a digital signal on a bit corresponding to the data. The second comparator Comp2 toggles as soon as the signal passes above or below the lower threshold value and as soon as the signal passes above or below the lower threshold value, and then supplies a digital signal on a bit that serves as a capture clock for the data. The lower and upper threshold values are adjustable.

However, under actual operating conditions, the transmission channel is noisy and the demodulation means are often imperfect. The consequence of this is such that, among the samples received by the DSS decoder, a certain number of them may be incorrect (1 in place of 0 and vice versa). As a matter of fact, the number of false samples captured by the sampler of the DSSS decoder depends directly on the quality of the demodulation as well as the noise level in the transmission channel. In the DSSS decoder, the signal presented to the two comparators is itself also incorrect. This then results in errors on the restored NRZ-encoded message (output of the comparator Comp1) and on the synchronization clock (output of the comparator Comp2) and therefore a significant degradation in the performance levels of the matched filter-based DSSS decoding process.

There is a need in the art to fix these problems.

SUMMARY OF THE INVENTION

An embodiment of the invention is a device for decoding a direct sequence spread spectrum-encoded binary message, including a sampler for capturing at least one sequence of binary samples corresponding to one bit of the transmitted message, said captured sequence of samples being applied to a filter matched to the spreading code used, making it possible to delete the spreading applied to the original message. The device includes, at the output of said sampler, an error correction block including means for storing a plurality of binary sequences corresponding to all of the possible values for a captured sequence of samples, and means for replacing said captured sequence of samples with the stored sequence, thereby minimizing the number of samples different from the captured sequence of samples, and in order to apply said stored sequence to said matched filter.

Preferably, for a spreading factor equal to N and for a sampling factor equal to K, corresponding to the number of samples captured by said sampler over the duration of one symbol element of the spreading code, the storage means of the error correction block store 4KN-2 different sample sequence values.

According to one embodiment, the device includes a first and a second hysterisis comparator installed at the output of the filter matched to the spreading code, which are capable of comparing the amplitude of the output signal of the matched filter to a lower threshold value and to an upper threshold value, and of delivering, respectively, the original binary message and its associated synchronization clock for capturing the data of said message.

Advantageously, the first and the second comparator have adjustable upper and lower threshold values.

The filter matched to the spreading code used is preferably a finite response digital filter.

An embodiment of the invention also relates to a device for receiving a modulated signal, suited to a transmission system using modulation of the carrier by a direct sequence spread spectrum-encoded binary message. The device includes a decoding device as just described.

In an embodiment, a device for decoding a direct sequence spread spectrum-encoded binary message comprises an error correction block receiving a sequence of binary samples corresponding to one bit of the message. The error correction block includes a memory storing a plurality of binary sequences corresponding to all values the sequence of binary samples can permissibly assume over time. The error correction block operates to compare the received sequence of binary samples against the stored binary sequences in the memory and replace the received sequence of binary samples with a closest stored binary sequence taken from the memory so as to generate an output corrected sequence of binary samples. A filter matched to the spreading code used receives said output corrected sequence of binary samples so as to delete applied spreading and produce a despread output.

In another embodiment, a method for decoding a direct sequence spread spectrum-encoded binary message comprises: receiving a sequence of binary samples corresponding to one bit of the message; storing a plurality of binary sequences corresponding to all values the sequence of binary samples can permissibly assume over time; comparing the received sequence of binary samples against the stored binary sequences in the memory; replacing the received sequence of binary samples with a closest stored binary sequence taken from the memory so as to generate an output corrected sequence of binary samples; and filtering said output corrected sequence of binary samples based on the spreading code used so as to delete applied spreading and produce a despread output.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The digital receiver device according to the invention is based on a DSSS decoder equipped with specific means making it possible to automatically correct the false samples of the signal received, which are linked to the imperfections of the demodulator and/or to the noise of the transmission channel.

Figure 1:
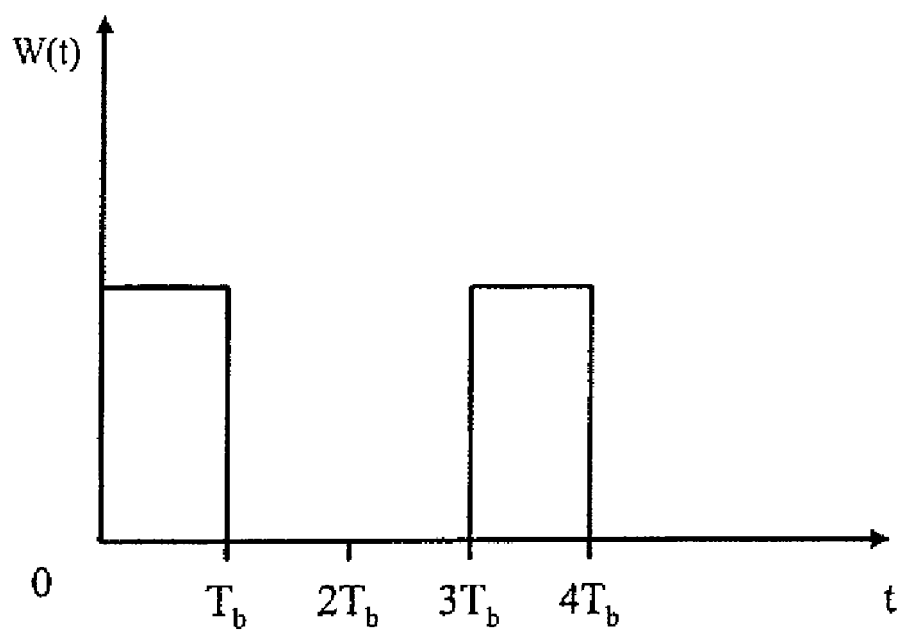
FIG. 1 shows the representation of a NRZ-encoded binary message and has already been described.
Figure 2:
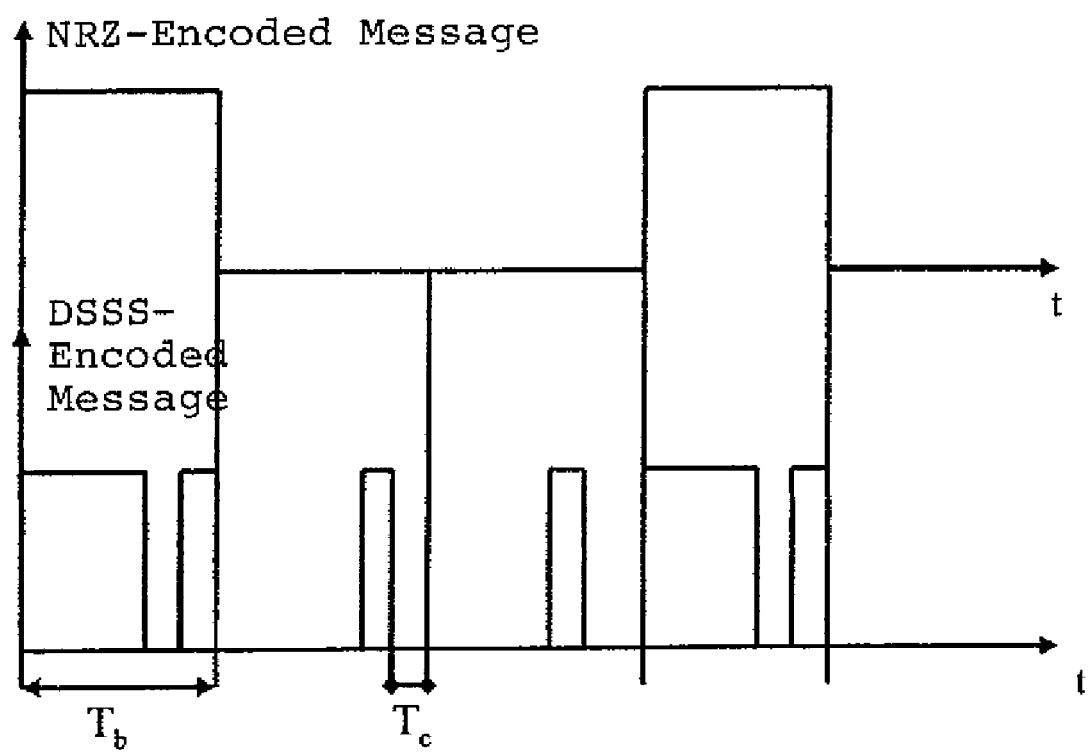
FIG. 2 shows the representation of the message of FIG. 1 encoded as Barker 5 and has already been described.
Figure 3:
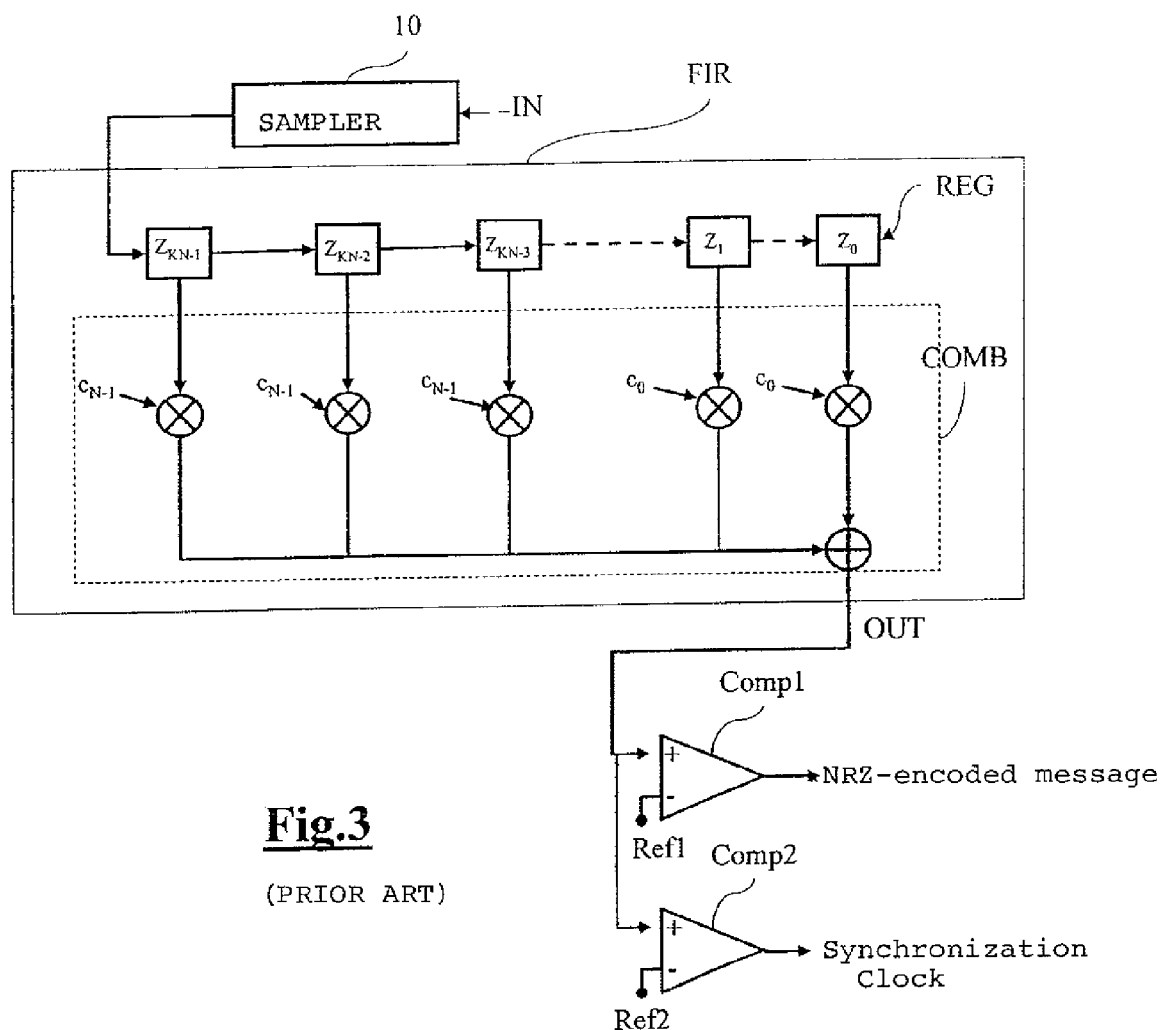
FIG. 3 is a diagram illustrating the structure of a DSSS decoder of a conventional digital receiver device and has already been described.
Figure 4:
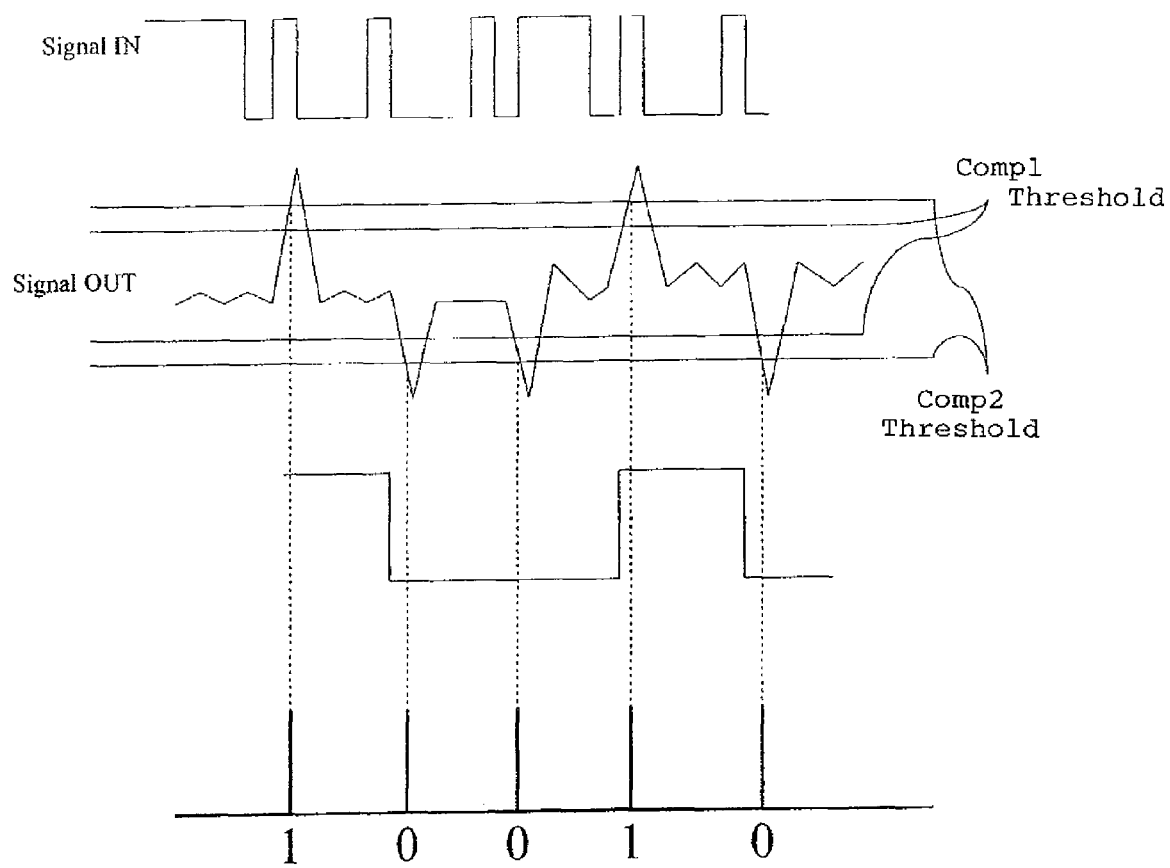
FIG. 4 shows the representation of the signals associated with the DSSS decoder of FIG. 3 for a message encoded as Barker 5 and has already been described.
Figure 5:
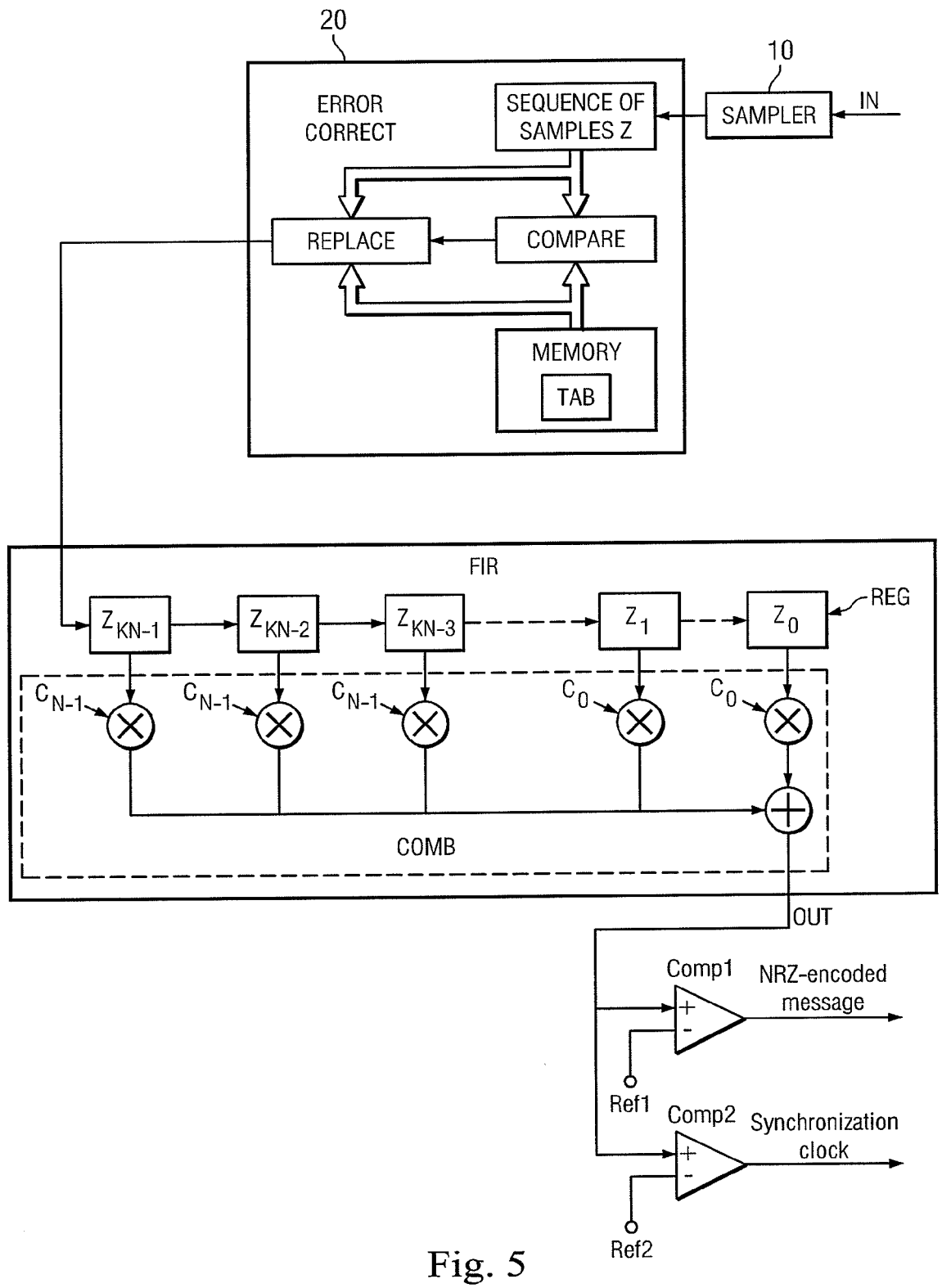
FIG. 5 is a diagram illustrating the structure of a DSSS decoder modified according to this invention.

The structure of a DSSS decoder modified according to the invention is diagrammed in FIG. 5. The elements in common with the decoder of FIG. 3 bear the same references. Thus, in addition to the elements already described in reference to FIG. 3, the modified decoder includes an error correction block 20 situated at the output of the sampler 10. The function of this block, which will be described more precisely below, is to enable correction of the binary sequence of samples $z=(z_0, \ldots, z_{KN-1})$ captured by the sampler 10, in the case of errors occurring during the transmission or demodulation phase.

In order to explain the operation of the error correction block, reference is made again to the example of the DSSS-encoded binary message to be transmitted $m=(1,0,0,1,0)$ with a spreading sequence having the pattern $c=(c_0,c_1,\ldots,c_{N-1})$. According to the example, the message is encoded with a Barker 5 code characterized by the sequence $c=(1,1,1,0,1)$. It is assumed that the sampling factor K is equal to 2.

In this context, the variables $z_0$ to $z_{KN-1}$ of the DSSS decoder shift register, which is provided for storing a certain number of samples of the signal received at the input of the decoder, corresponding to one bit of the message transmitted, amount to K.N=10. Thus, $Z=(z_0, z_1, \ldots, z_9)$ is the binary sequence of samples captured by the sampler 10 of the decoder. Furthermore, the sequence of the spreading coded over-sampled by a factor of K is noted as x. With the Barker code 5 sampled by a factor of 2, the sequence $x=(1,1,1,1,1,1,0,0,1,1)$ is obtained. The operation of the error correction block 20 rests therefore on the following principle.

At a given moment, according to the example with the Barker code 5 and a sampling factor equal to 2, the sequence Z always consists of 10 bits taken consecutively in a sequence of 20 y bits, defined such that:

$$y = \begin{Bmatrix} xx \\ x\bar{x} \\ \bar{x}x \\ \bar{x}\bar{x} \end{Bmatrix}$$

The sequence x of the over-sampled spreading code depends solely on the DSSS code used and on the sampling factor selected, the sequence $\bar{x}$ being the complementary sequence to the sequence x. Taking into account that for each value of y, z can assume 10 different values, and since y can assume four values, z can assume forty values in all. More precisely, since this reasoning leads to the values x and $\bar{x}$ being counted twice, z can in fact assume only 38 possible values over time.

Generally speaking, if K is the sampling factor and N is the spreading factor, then Z can assume 4KN-2 possible values.

If, at a given moment, a message encoded as Barker 5 with a sampling factor of K=2 is considered, then the length of the binary sequence of samples Z is thus K*N=2*5=10 samples, and the sequence Z can assume 4KN-2=38 different values. These values assumed by Z for a message encoded as Barker 5 are recorded in the table below:

| | |
|---|---|
| 1 | 0000001100 |
| 2 | 0000011000 |
| 3 | 0000110000 |
| 4 | 0001100000 |
| 5 | 0011000000 |
| 6 | 0110000000 |
| 7 | 1100000000 |
| 8 | 1000000001 |
| 9 | 0000000011 |
| 10 | 0000000110 |
| 11 | 0000011001 |
| 12 | 0000110011 |
| 13 | 0001100111 |
| 14 | 0011001111 |
| 15 | 0110011111 |
| 16 | 1100111111 |
| 17 | 1001111110 |
| 18 | 0011111100 |
| 19 | 0111111001 |
| 20 | 1111110011 |
| 21 | 1111100111 |
| 22 | 1111001111 |
| 23 | 1110011111 |
| 24 | 1100111111 |
| 25 | 1001111111 |
| 26 | 0011111111 |
| 27 | 0111111110 |
| 28 | 1111111100 |
| 29 | 1111111001 |
| 30 | 1111100110 |
| 31 | 1111001100 |
| 32 | 1110011000 |
| 33 | 1100110000 |
| 34 | 1001100000 |
| 35 | 0011000000 |
| 36 | 0110000001 |
| 37 | 1100000011 |
| 38 | 1000000110 |

The error correction block 20 of the DSSS decoder is thus provided with a memory for storing in a table (Tab) all of the different values that the sequence of samples Z can assume over time.

In this way, when a DSSS-encoded message is being transmitted, it is known that the binary sequence of samples captured by the sampler of the DSSS decoder must have for a value one of the values stored in the error correction block for close transmission errors.

Therefore, for each sequence of samples Z actually captured by the sampler, the correction made by the error correction block 20 comprises intercepting this sequence Z and replacing it with the sequence from the table stored in the correction block 20 that is the closest to it.

In order to accomplish this, the binary sequence Z captured is compared to all of the values in the table storing all of the possible values that can be assumed by the sequence Z over time. More precisely, for each sequence of the table, the correction block counts the number of different samples between the sequence captured by the sampler and the sequence from the table. The correction block then supplies the DSSS decoder with the sequence of samples stored in the table, which minimizes this number of samples that are different from the captured sequence.

When it is integrated with the DSSS decoder, the error correction block 20 thus makes it possible to significantly reduce errors relating to restoration of the clock as well as the original message.

The principle of operation of the error correction block as just described is particularly advantageous in the sense that it does not require any additional encoding (such as redundant encoding or conventional encoding), or synchronization of the samples to be corrected. The information rate is thus not affected by the correction system according to the invention.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A device for decoding a direct sequence spread spectrum-encoded binary message, comprising:
   a sampler configured to capture at least one sequence of binary samples corresponding to one bit of a transmitted message;
   a filter matched to a spreading code used and to which said captured sequence of samples is applied, making it possible to delete spreading applied to an original binary message; and
   an error correction block, at the output of said sampler, the error correction block configured to:
      store a plurality of binary sequences corresponding to all of the possible values for a captured sequence of samples representing the one bit in a first logic state, a second logic state and transitions between the first and second logic states; and
      replace said captured sequence of samples with the stored binary sequence having a minimal number of samples different from the captured sequence of samples,
   the error correction block outputting the replaced stored binary sequence to said matched filter.

2. The device of claim 1, wherein, for a spreading factor equal to N and for a sampling factor equal to K corresponding to a number of samples captured by said sampler over the duration of one symbol element of the spreading code, the configured to store is performed by the error correction block comprises storing 4KN-2 different sample sequence values.

3. The device of claim 1, further comprising a first comparator and a second comparator installed at the output of the filter matched to the spreading code, the comparators configured to compare an amplitude of an output signal of the matched filter to a lower threshold value and to an upper threshold value, respectively, and deliver the original binary message and its associated synchronization clock, respectively, for capturing data of said original binary message.

4. The device of claim 3, wherein the first and the second comparator have adjustable upper and lower threshold values.

5. The device of claim 1, wherein the filter matched to the spreading code used is a finite response digital filter.

6. A device for receiving a modulated signal, suited to a transmission system using modulation of the carrier by a direct sequence spread spectrum-encoded binary message, wherein the device includes a decoding device comprising:
   a sampler configured to capture at least one sequence of binary samples corresponding to one bit of a transmitted message;
   a filter matched to a spreading code used and to which said captured sequence of samples is applied, making it possible to delete spreading applied to an original message; and
   an error correction block, at the output of said sampler, the error correction block configured to:
      store a plurality of binary sequences corresponding to all of the possible values for a captured sequence of samples representing the one bit in a first logic state, a second logic state and transitions between the first and second logic states; and
      replace said captured sequence of samples with the stored binary sequence having a minimal number of samples different from the captured sequence of samples,
   the error correction block outputting the replaced stored binary sequence to said matched filter.

7. A device for decoding a direct sequence spread spectrum-encoded binary message, comprising:
   an error correction block configured to receive a sequence of binary samples corresponding to one bit of the message, the error correction block including:
      a memory configured to store a plurality of binary sequences corresponding to all values the sequence of binary samples can permissibly assume over time representing the one bit in a first logic state, a second logic state and transitions between the first and second logic states,
   the error correction block further configured to compare the received sequence of binary samples against the stored binary sequences in the memory and replace the received sequence of binary samples with a closest stored binary sequence taken from the memory so as to generate an output corrected sequence of binary samples; and
   a filter matched to a spreading code used and to which said output corrected sequence of binary samples is applied so as to delete applied spreading and produce a despread output.

8. The device of claim 7, further comprising:
   a first comparator configured to receive the despread output and compare the despread output against a lower threshold value to generate an original binary message output; and
   a second comparator configured to receive the despread output and compare the despread output against an upper threshold value to generate a synchronization clock associated with the original binary message output.

9. The device of claim 8, wherein the first and the second comparators have adjustable upper and lower threshold values.

10. A method for decoding a direct sequence spread spectrum-encoded binary message, comprising:
   receiving a sequence of binary samples corresponding to one bit of the message;
   storing a plurality of binary sequences corresponding to all values the sequence of binary samples can permissibly assume over time representing the one bit in a first logic state, a second logic state and transitions between the first and second logic states in a memory;
   comparing the received sequence of binary samples against the stored binary sequences in the memory;
   replacing the received sequence of binary samples with a closest stored binary sequence taken from the memory so as to generate an output corrected sequence of binary samples; and filtering said output corrected sequence of binary samples based on a spreading code used so as to delete applied spreading and produce a despread output.

11. The method of claim 10 further comprising sampling a received signal to capture the sequence of binary samples corresponding to one bit of the transmitted message.

12. The method of claim 10 further comprising comparing the despread output against a lower threshold value to generate an original binary message output.

13. The method of claim 10 further comprising comparing the despread output against an upper threshold value to generate a synchronization clock associated with the original binary message output.

14. A device for decoding a direct sequence spread spectrum-encoded binary message, comprising:
   an error correction block configured to receive a sequence of binary samples corresponding to one bit of the message, the error correction block including:
      a memory adapted to store a plurality of binary sequences corresponding to all shifted values the sequence of binary samples can permissibly assume over time for that one bit of the message,
   the error correction block configured to compare the received sequence of binary samples against the stored binary sequences in the memory and replace the received sequence of binary samples with a closest one of the compared plurality of binary sequences so as to generate an output corrected sequence of binary samples; and
   a filter matched to a spreading code used and to which said output corrected sequence of binary samples is applied so as to delete applied spreading and produce a despread output,
   wherein the plurality of binary sequences corresponding to all shifted values the sequence of binary samples can permissibly assume over time for that one bit of the message include binary sequences representing shifted positions for the one bit of a first logic state, a second logic state and transitions between the first and second logic states.

15. The device of claim 14, further comprising:
   a first comparator configured to receive the despread output and compare the despread output against a lower threshold value to generate an original binary message output; and
   a second comparator configured to receive the despread output and compare the despread output against an upper threshold value to generate a synchronization clock associated with the original binary message output.

16. The method of claim 10 further comprising comparing the despread output against a lower threshold value to generate an original binary message output and comparing the despread output against an upper threshold value to generate a synchronization clock associated with the original binary message output.

* * * * *